May 30, 1967 — E. S. JOLINE — 3,321,968
PRESSURE RATE SENSING DEVICE
Filed April 2, 1965 — 2 Sheets-Sheet 1
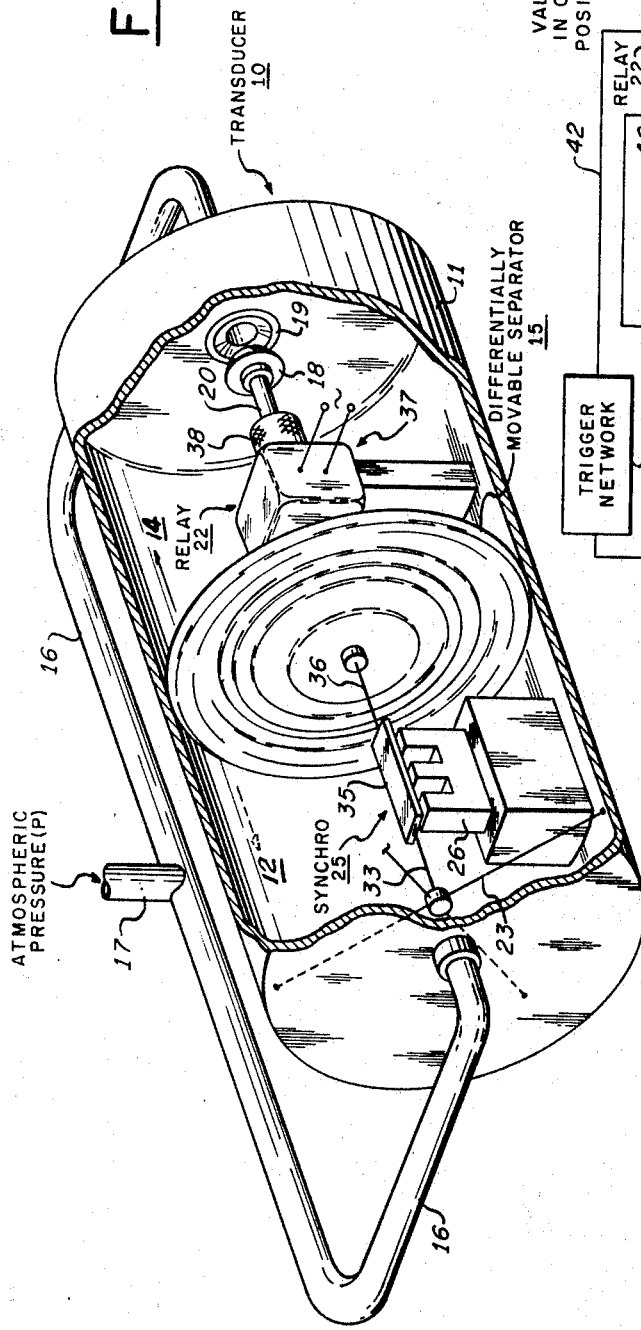
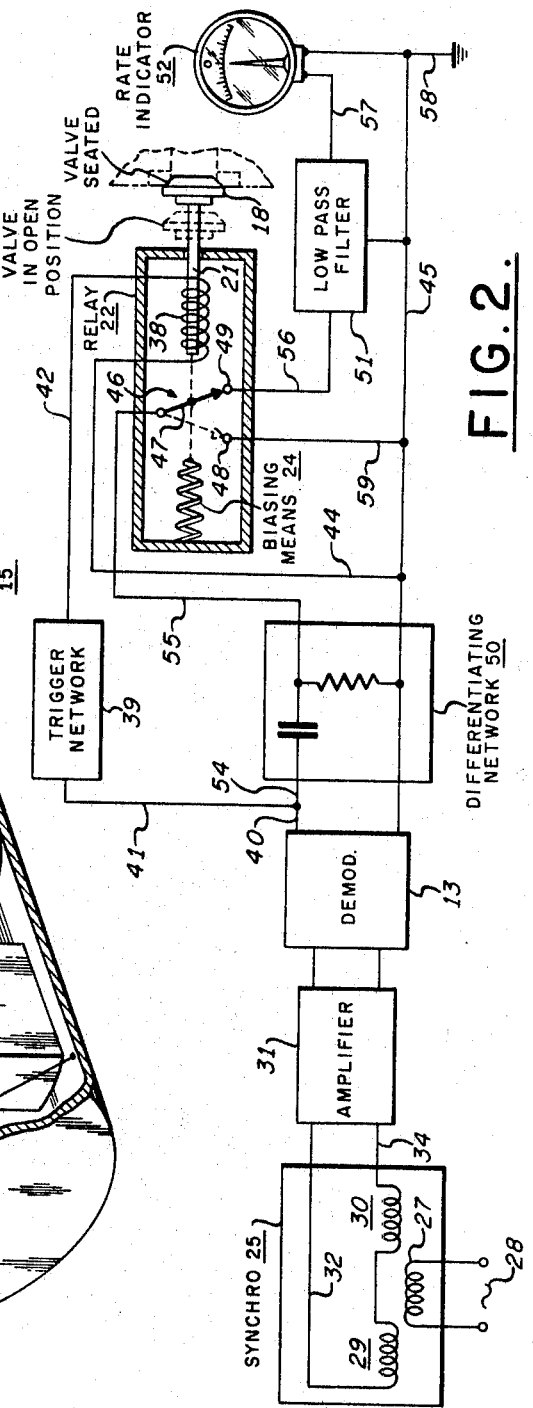
INVENTOR.
EVERETT S. JOLINE
BY Arthur H. Sewell
ATTORNEY

United States Patent Office 3,321,968
Patented May 30, 1967

3,321,968
PRESSURE RATE SENSING DEVICE
Everett S. Joline, Huntington, N.Y., assignor to Sperry Rand Corporation, Great Neck, N.Y., a corporation of Delaware
Filed Apr. 2, 1965, Ser. No. 445,125
11 Claims. (Cl. 73—179)

This invention relates to an improvement in devices for sensing the rate of change of pressure in a medium of variable pressure. Where the medium is the atmosphere and the pressure is atmospheric pressure, the device used with an indicator on an aircraft movable vertically with relation to the earth provides a measure of the speed of the craft in a vertical direction. Here, the pressure change sensed by the device depends on the change of altitude of the aircraft in the medium. Also, where the medium is the atmosphere and the device is fixed in relation to the earth, the measure provided is the rate of change of atmospheric pressure.

The improved sensing device includes a transducer having a compartment with a continuously open chamber and an intermittently open chamber, and a separator or diaphragm between the chambers movable differentially between determined limits from an equalized pressure condition of the chambers. The limits are established in accordance with the motion of the separator or diaphragm, and a structure that includes a valve and seat for closing the intermittently open chamber, a biasing means for normally seating the valve, and a means for overcoming the biasing means to unseat the valve and equalize the pressure conditions of the chambers. This extends the range of pressure from a base pressure that the transducer is operable in with the sensitivity and resolution required to produce an accurate output.

The output of the transducer is provided by an electrical synchro or pick-off with a null corresponding to the equalized pressure condition of the chambers of the transducer and a part operatively connected to the diaphragm or separator. The A.C. output of the synchro is reversible and changes in amplitude and phase with the direction and sense of the motion of the separator between its limits from the equalized pressure condition of the transducer.

Further electrical components of the improved device include a relay operatively connected to the valve of the transducer that is responsive to the A.C. output of the synchro or pick-off. The relay of the device further includes a switch that normally closes a circuit with the valve seated that includes a demodulator connected to the synchro or pick-off, a network for differentiating the output of the demodulator, a low pass filter for filtering the output of the network, and a rate indicator responsive to the output of the filter. In the intervals of operation of the device where the valve is unseated, the switch of the relay closes a circuit that bypasses the filter and indicator of the normally closed circuit.

In accordance with the invention, the improved sensing device utilizes a transducer in which the pressure differential between the chambers is limited to a relatively narrow pressure range to obtain the required resolution and sensitivity.

Further features and structural details of the present invention will be apparent from the following description when read in relation to the accompanying drawings wherein:

FIG. 1 is a perspective view partly in cross section of the differential pressure transducer of the improved device;

FIG. 2 is an electrical schematic and wiring diagram of the circuit components of the improved device.

Figure 3:
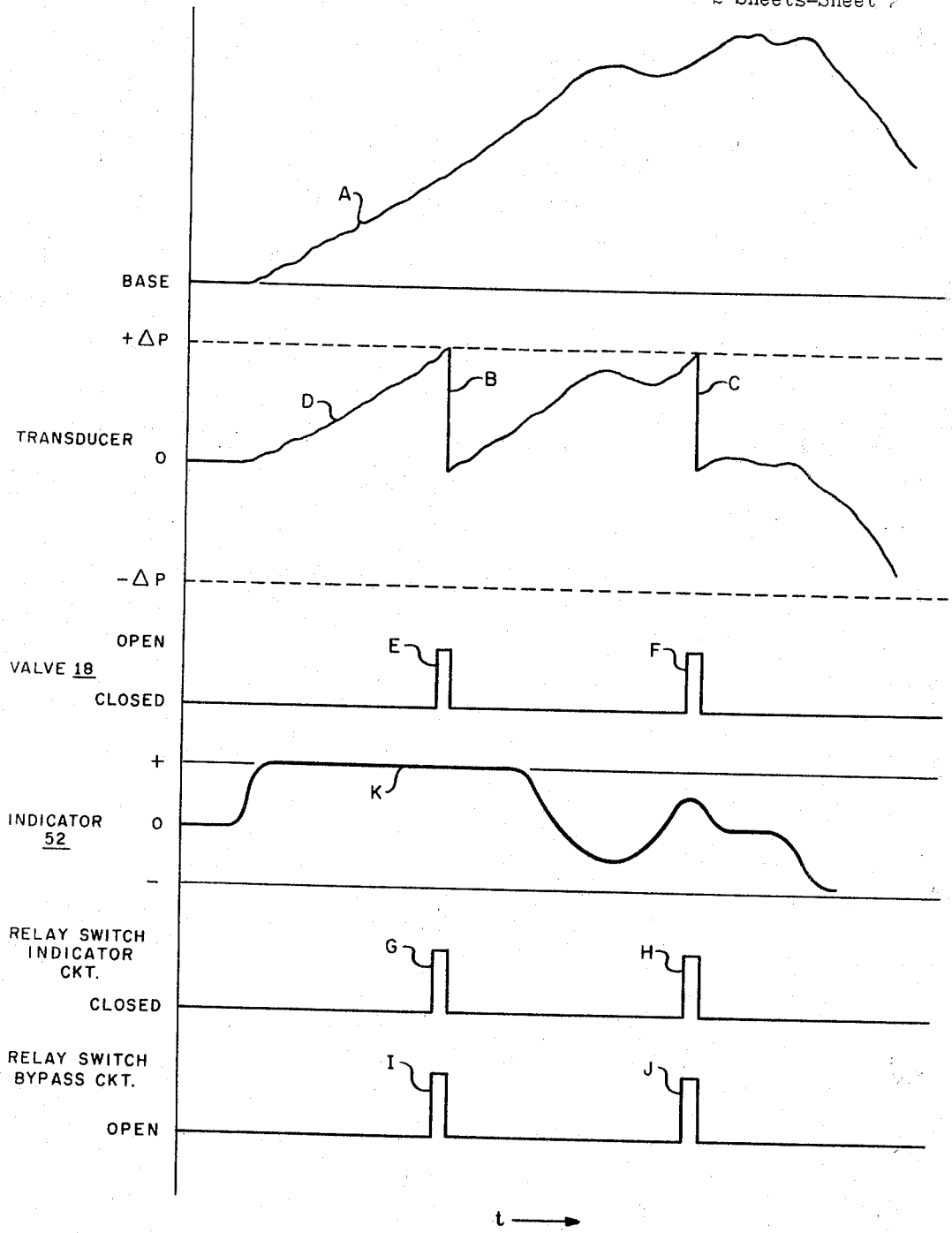
FIG. 3 is a system of curves related by a common time $t$ axis that are herein described in explanation of the operation of the improved device.

As shown in FIG. 1, a sensing device constructed in accordance with the present invention includes a transducer 10 in the form of a pressure tight compartment or tubular piece 11 of two chambers 12 and 14 with a differentially movable separator or diaphragm 15 between the chambers. As shown, the transducer 10 is located in a medium of variable pressure or atmosphere pressure P, the pressure of the medium communicating with the chambers 12 and 14 through means such as a conduit or pipe 16 with a central opening 17 to the atmosphere. One end of the pipe 16 is connected to the transducer 10 to communicate the pressure P at opening 17 to the chamber 12. The other end of the pipe 16 is connected to the transducer 10 to communicate the pressure P at opening 17 to the chamber 14. Chamber 12 of the transducer is continuously open. Chamber 14 of the transducer is intermittently open. FIG. 3 shows an illustrative variable pressure curve A for a given pressure medium where the ordinate axis is pressure P with respect to a fixed base pressure and the abscissa axis is time $t$.

In the improved device, the diaphragm or separator 15 moves differentially between pressure limits represented in FIG. 3 at $(+\Delta P)$ and $(-\Delta P)$ from a pressure equalized condition of the chambers indicated at O. To provide the illustrated relatively narrow pressure range, the device includes a valve 18 and seat 19 for closing the intermittently open chamber 14. As shown in FIGS. 1 and 2, the valve stem 20 and valve 18 move longitudinally within the chamber 14 away from seat 19 with an armature 21 of a relay 22. Valve 18 is normally seated by a biasing means such as a compression spring 24. The biasing means 24 is overcome to unseat the valve 18 in relation and equalize the pressures in the chambers 12, 14 as indicated in FIG. 3 by the substantially vertical line portions B and C of the differential pressure curve D. As indicated by lines B and C in FIG. 3, at differential pressure limit $(+\Delta P)$ where the pressure in chamber 12 is greater than that of chamber 14 by the noted value, the valve 18 opens to admit pressure to chamber 14 to restore the transducer 10 to the equalized pressure condition indicated at O. The second operation of the valve 18 indicated by line C occurs at a higher pressure level of the pressure P as shown in curve A. In reverse operation, the pressure in chamber 12 goes below that of the pressure in chamber 14 by the limit $(-\Delta P)$ to obtain the described result where the pressures are equalized in successive stages of lowering pressures. Here at the differential pressure limit $(-\Delta P)$, the valve 18 is unseated against the influence of the biasing means to equalize the pressures in the respective chambers 12, 14. Under increasing pressure conditions, the separator 15 of the transducer 10 moves in the direction of the full line arrow in FIG. 1 until the pressure differential $(+\Delta P)$ is sufficient to unseat the valve 18. Under decreasing pressure conditions, the separator 15 of the transducer 10 moves in the direction of the dotted line arrow in FIG. 1 until the pressure differential $(-\Delta P)$ is sufficient to unseat the valve 18. As shown in FIG. 3, the diaphragm or separator 15 of the transducer 10 moves between the determined $(+\Delta P)$ and $(-\Delta P)$ limit from the equalized pressure condition O.

The device includes means for overcoming the biasing means 24 to unseat the valve 18 and thereby connect the normally closed chamber 14 to pressure P and equalize the pressures in the chambers 12, 14. The bias overcoming means shown in FIGS. 1 and 2 is an electrical transmitting means in the form of a synchro or pick-off 25 of the magnetic type having an E-shaped stator 26 fixedly mounted in chamber 12 with a central leg winding 27 energized from an A.C. source 28. The other legs of the stator of synchro 25 include output windings 29 and 30 that are connected to amplifier 31 by way of leads 32 and 34. Synchro 25 further includes an armature 35 that is located in chamber 12 to move differentially with respect to the stator depending on the axial motion of diaphragm 15. As shown in FIG. 1, one end of the armature 35 is connected to the diaphragm 15 by a wire 36. The other end of the armature 35 is connected to the transducer 10 by a wire 33 and a cross spring structure 23. The null of the synchro 25 corresponds to the equalized pressure condition O of the transducer 10. Motion of the separator 15 from such centralized position with relation to tube 11 moves the armature 35 with respect to the stator 26 with the synchro producing a reversible electrical output whose amplitude depends on the distance of the armature motion and whose phase depends on the sense of the armature motion. As shown in FIG. 1, the armature part of the A.C. synchro or pick-off 25 is operatively connected to the diaphragm or separator 15.

The valve 18 of the improved device unseats when the output of the pick-off or synchro 25 is at one of the pressure limits $(+\Delta P)$ or $(-\Delta P)$ represented in FIG. 3. The means provided to obtain this result responsive to the output of the synchro 25 includes the relay 22 and its armature part 21 operatively connected to valve 18. Relay 22 further includes a stator part 37 mounted in fixed relation to tube 11 within chamber 14 whose coil is indicated at 38. The coil 38 is energized at the required level from the output of synchro 25 by way of amplifier 31, a demodulator 13 and a triggering means or network 39 in a circuit that includes lead 40 to demodulator 13, lead 41 connecting lead 40 to triggering network 39, lead 42 between the network 39 and one end of the coil 38 and lead 44 from the other end of the coil 38 to a ground lead 45. With relation to the portion of FIG. 3 showing the time of operation of valve 18, curves E and F, are synchronized with the differential pressure curves B and C respectively. As the time required to equalize the pressures in chambers 12, 14 is short after the coil 38 of relay 22 is energized, the normal operative condition of the valve 18 is one that closes off chamber 14 with respect to pressure P under the influence of the biasing means 24. Accordingly, valve 18 is normally biased against its seat 19 by spring 24 to close chamber 14 with respect to the medium of movable pressure P.

Relay 22 further includes a switch 46, with a knife blade 47 and spaced contacts 48, 49. The blade 47 moves with the armature 21 of relay 22 to normally engage the contact 49 due to the influence of the biasing means 24. Here, the device includes a differentiating means or network 50, filtering means or low pass filter 51 and a rate indicator 52 in a circuit with the synchro 25, amplifier 31 and demodulator 13. As shown, network 50 is connected to demodulator 13 by way of lead 40 and lead 54. Lead 55 connects the output of network 50 to the blade 47. Lead 56 connects contact 49 to the filter 51, and lead 57 connects the output of the filter 51 to the rate indicator 52. Lead 58 connects the indicator 52 to the ground lead 45. A circuit that bypasses the filter 51 and indicator 52 is closed by switch 46 when blade 47 is moved to its dotted line position in FIG. 2 to engage contact 48 when the coil 38 of relay 22 is energized to open condition the valve 18. In the bypass circuit, contact 48 is connected to ground lead 45 by way of lead 59. The relay switch curves G and H for the indicator circuit and curves I and J for the bypass circuit synchronize with the valve condition curves E and F respectively along the time $t$ axis. In the described indicator circuit the time constant of the filter 51 is short as compared to that of the differentiating network 50 so as to smooth any discontinuity in the output of the network 50 due to unseating of the valve 18. The bypass circuit connects the network 50 to the ground lead 45 as the output of the synchro 25 is nulled with the valve in open condition. The curve K in FIG. 3 shows how the pointer of indicator 52 would move with relation to its fixed scale for a pressure varying in the manner indicated by the curve A. The time interval that the valve 18 remains unseated after operation of the relay 22 is of sufficient duration as to allow transients due to the flow to or from chamber 14 of the pressure medium to subside. The pick-off or synchro 25 operates as the armature 35 moves between the pressure limits of the diaphragm 15 to produce a reversible electrical output that is fed to network 50 by way of amplifier 31 and demodulator 13. The network 50 differentiates the output of the demodulator 13. The filtering means or filter 51 receives the output of network 50 by way of switch 46 and provides the smoothed output required to operate the rate indicator 52. Indicator 52 is responsive to the output of the filter 51.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A pressure rate sensing device operable in a medium of variable pressure including a transducer having a compartment with a chamber continuously open to the medium and a chamber intermittently open to the medium, a differentially movable diaphragm between the chambers, a valve and a seat for the valve for closing the opening to the intermittently open chamber, biasing means for seating the valve between determined limits from an equalized pressure condition of the chambers; means for overcoming the valve biasing means to unseat the valve including an A.C. pick-off having a null output with an equalized pressure condition of the chambers of the transducer and an armature operatively connected to the diaphragm, a relay having an armature operatively connected to the valve and a switch, a circuit for energizing the relay from the output of the pick-off including a demodulator and a trigger network, and a second circuit closed by the switch with the valve seated including the pick-off and demodulator, a network for differentiating the output of the demodulator, a low pass filter for filtering the output of the network, and a rate indicator responsive to the output of the filter.

2. A device of the character claimed in claim 1, including a third circuit closed by the switch with the valve unseated that bypasses the filter and indicator of the second circuit.

3. In a pressure rate sensing device operable in a medium of variable pressure, a transducer having a compartment of two chamber, a differentially movable separator between the chambers, an open conduit between one of the chambers and the medium, an intermittently open conduit between the other of the chambers and the medium having a valve and a seat for the valve, means for normally seating the valve for motions of the separator between determined limits from an equalized pressure condition of the chambers; means for overcoming the seating means to unseat the valve including an electrical synchro having a reversible output with a null corresponding to the equalized pressure condition of the chambers of the transducer and a part operatively connected to the separator, a relay having an armature connected to the valve; and a circuit for energizing the relay from the output of the synchro including a trigger network.

4. A device of the character claimed in claim 3, in which the relay includes a switch, a second circuit closed by the switch with the valve seated including the synchro, a network for differentiating the output of the synchro, a low pass filter for filtering the output of the network, and a rate indicator responsive to the output of the filter.

5. A device of the character claimed in claim 4, including a third conduit closed by the switch with the valve unseated that bypasses the filter and indicator of the second circuit.

6. In a pressure rate sensing device operable in a medium of variable pressure; a transducer having a compartment of two chambers, a diaphragm between the chambers movable differentially between pressure limits from an equalized pressure condition of the chambers, an open pipe between the medium and one of the chambers, an intermittently open pipe between the medium and the other of the chambers having a valve and a seat for the valve, biasing means for seating the valve between determined pressure limits of the transducer; means for overcoming the valve biasing means to unseat the valve and equalize the pressures in the chambers including synchro means having a part operatively connected to the diaphragm to produce an electrical output, and means responsive to the output of the synchro means having a movable part operatively connected to the valve.

7. A device of the character claimed in claim 6, in which the output responsive means is a relay with a changeover switch, and including differentiating means, filtering means, a rate indicator, a circuit closed by the switch with the valve seated including the synchro means, the differentiating means, the filtering means and the rate indicator, and a second circuit closed by the switch with the valve unseated that bypasses the filtering means and rate indicator of the first circuit.

8. In a pressure rate sensing device; a transducer having a compartment with a continuously open chamber and an intermittently open chamber, a separator between the chambers differentially movable between pressure limits from an equalized pressure condition of the chambers, a valve and a seat for the valve for closing the intermittently open chamber, biasing means for seating the valve between determined pressure limits of the transducer, and means for overcoming the biasing means to unseat the valve and equalize the pressures in the chambers including a synchro having a movable part operatively connected to the separator to produce an electrical output, and means responsive to the output of the synchro operatively connected to the valve.

9. A combination of the character claimed in claim 8, in which the output responsive means is a relay with a changeover switch, said combination also including differentiating means, filtering means, a rate indicator, a circuit closed by the switch with the valve seated including the synchro, the differentiating means, the filtering means and the rate indicator, and a second circuit closed by the switch with the valve unseated that bypasses the filtering means and indicator of the first circuit.

10. In a pressure rate sensing device, a transducer having a compartment with a continuously open chamber and an intermittently open chamber, a diaphragm between the chambers movable differentially between pressure limits from an equalized pressure condition of the chambers, a valve and a seat for the valve for closing the intermittently open chamber, means for unseating the valve to equalize the pressures between the chambers including a pick-off with an armature operatively connected to the diaphragm having a reversible electrical output with a null corresponding to the equal pressure condition of the chambers, and means operatively connected to the valve responsive to the output of the pick-off at one of the pressure limits of the diaphragm.

11. In a pressure rate sensing device, a transducer having a compartment with a continuously open chamber and an intermittently open chamber, a valve and a seat for closing the intermittently open chamber, a diaphragm between the chambers movable differentially between determined pressure limits, a pick-off having an electrical output depending on the motion of the diaphragm, a demodulator connected to the pick-off, a network for differentiating the output of the demodulator, a low pass filter for filtering the output of the network, and a rate indicator responsive to the output of the filter.

References Cited
UNITED STATES PATENTS

| | | | |
|---|---|---|---|
| 2,775,122 | 12/1956 | Smith et al. | 73—179 |
| 3,181,359 | 4/1965 | Osterstrom | 73—407 |

LOUIS R. PRINCE, *Primary Examiner.*

N. B. SIEGEL, *Assistant Examiner.*